United States Patent [19]
Flynn

[11] Patent Number: 5,857,798
[45] Date of Patent: Jan. 12, 1999

[54] GOLF FLAG THEFT PROTECTION

[76] Inventor: James L. Flynn, 54 McNab Ave., Cedar Knolls, N.J. 07927

[21] Appl. No.: 832,036

[22] Filed: Apr. 3, 1997

[51] Int. Cl.$^6$ .................................................... B25G 3/00
[52] U.S. Cl. ........................................... 403/256; 411/910
[58] Field of Search ..................................... 411/910, 372, 411/373, 374; 116/173; 403/299, 256; 285/390; 70/232, DIG. 57

[56] References Cited

U.S. PATENT DOCUMENTS

| | | | |
|---|---|---|---|
| 1,317,445 | 9/1919 | Hoffman | 116/173 |
| 1,568,320 | 1/1926 | Coldwell | 273/34 |
| 1,631,566 | 6/1927 | Walton | 116/173 |
| 2,072,573 | 3/1937 | Vigliotti | 116/173 |
| 3,279,838 | 10/1966 | Hamilton | 411/910 X |
| 4,502,825 | 3/1985 | Yamada | 411/910 X |
| 4,621,230 | 11/1986 | Crouch et al. | 411/910 X |
| 4,732,517 | 3/1988 | Crouch et al. | 411/910 X |
| 5,015,017 | 5/1991 | Geary | 285/390 X |
| 5,615,635 | 4/1997 | Deviney | 116/173 |

FOREIGN PATENT DOCUMENTS 2 095 356  9/1982  United Kingdom.

OTHER PUBLICATIONS

Standard Golf Company, 1997 Catalog Golf Course Accessories pp. 28–30.

Primary Examiner—Kenneth J. Dorner
Assistant Examiner—William L. Miller

[57] ABSTRACT

A locking cap for deterring unauthorized removal of golf course flags consists of a bolt, the head of which is loosely captured within a protective shell. The bolt head has a socket, shaped to receive a specialized removal tool and this shell has a hole at its top so the socket can be accessed by the tool. The flag is mounted on a tube, terminated at its upper end by a cap with a hole large enough to loosely pass the threaded shank of the bolt. The flag staff or "pin" marking each golf course hole has a threaded hole at the top to receive the bolt shanks. When the shank bottoms in the hole, enough space remains between the bolt head and the shoulder of the pin so that the shell and end cap are loosely captured, permitting the flag to freely rotate around the pin.

6 Claims, 3 Drawing Sheets

GOLF FLAG THEFT PROTECTION

BACKGROUND OF THE INVENTION

1. Field of the Invention

The invention is in the field of security devices.

2. Background Art

The flags that mark the holes of a golf course are mounted so they can freely rotate around the flag staff, referred to as a "pin". In this way they do not wrap around the pin as the wind blows, remaining visible and providing the golfer with a visible indication of the wind direction at the green. One method of rotatably mounting a golf flag, disclosed in U.S. Pat. No. 2,072,573, mounts the flag on a rotatable section of the flag staff. In another rotatable flag support, disclosed in U.S. Pat. No. 1,631,566 the flag is mounted on a sleeve that is loosely fitted to the flag staff. The patent disclosed several methods of maintaining the flag's position at the top of the staff.

This latter method has been adapted to form a widely used "tube mounted" method for rotatably mounting golf flags. These tube mounted flags are affixed to a tube that loosely fits the top of the pin. The tube is terminated at the top by an end cap with a hole that easily passes the threaded stud at the upper end of a standard golf course pin. The hole in the end cap does not clear the diameter of the pin so that the end cap rests on a shoulder where the threaded stud joins the top of the pin. Once the tube mounted flag has been slid over the top of the pin, an acorn nut (a nut with a closed top) is used to secure the flag to the pin. The stud is long enough so that when the acorn nut is fully tightened the end cap is loosely captured.

However, such acorn nuts are easily removed by hand or with a common tool, such as a wrench or plier, making the flags susceptible to unauthorized removal. Theft of golf course flags is a significant problem, particularly at resorts and other prestigious courses, where the flags might have expensively embroidered or silk screened decorations. For a tournament, the sponsoring golf club often has specially decorated commemorative flags made. These flags make attractive souvenirs and often disappear. While it is difficult to foil the efforts of a dedicated thief. A simple theft resistant device to thwart the casual souvenir hunter could significantly reduce the incidents of such disappearances.

SUMMARY OF THE INVENTION

Using the invention disclosed and claimed herein, theft of tube mounted golf course flags is deterred by provision of a theft resistant locking cap at the top of the golf pin. The cap is constructed so that all parts susceptible of easy removal are protected and the pattern of the removal socket is chosen to resist removal by hand or commonly available tools.

The locking cap for deterring unauthorized removal of golf course flags consists of a bolt, the head of which is loosely captured within a protective shell. The bolt head has a socket, shaped to receive a specialized removal tool and the shell has a hole at its top so the socket can be accessed by the tool. The flag is mounted on a tube, terminated at its upper end by a cap with a hole large enough to loosely pass the threaded shank of the bolt. The flag staff or "pin" marking each golf course hole is provided with a threaded hole at the top to receive the bolt shank. When the shank bottoms in the hole, enough space remains between the bolt head and the shoulder of the pin so that the shell and the end cap are loosely captured, permitting the flag to freely rotate around the pin and preventing the bolt from being loosened by rotation of the shell.

Thus, simply providing golf course pins with a threaded hole at the top or providing an adapter fitting, screwed onto the standard stud topped pin, and securing the flag with a theft resistant locking cap, will inexpensively address the flag theft problem.

DETAILED DESCRIPTION OF THE INVENTION

Figure 1:
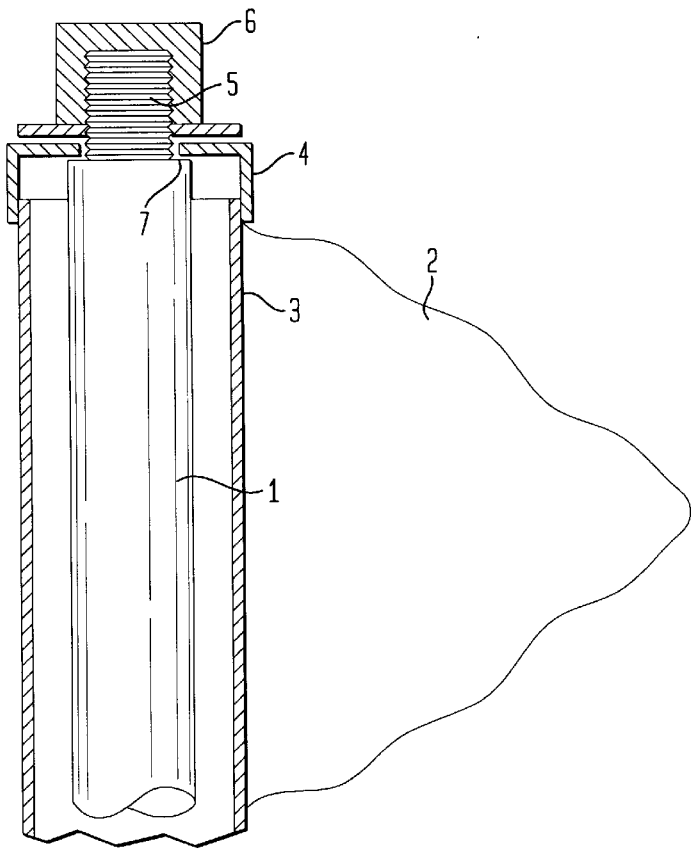
FIG. 1 is an elevational view, partly in section, of the top of a prior art golf course pin and a portion of a tube mounted flag.

FIG. 1 shows the prior art method of securing a flag 2 mounted on a tube 3 to a golf course pin 1 that terminates in a threaded stud 5. The end cap 4 of the tube 3 rests on the shoulder 7 of the pin 1 and is loosely captured by a closed ended nut 6, such as an acorn nut. The flag 2 and tube 3, with its end cap 4 are free to rotate around the pin 1 as the wind changes direction.

Figure 2:
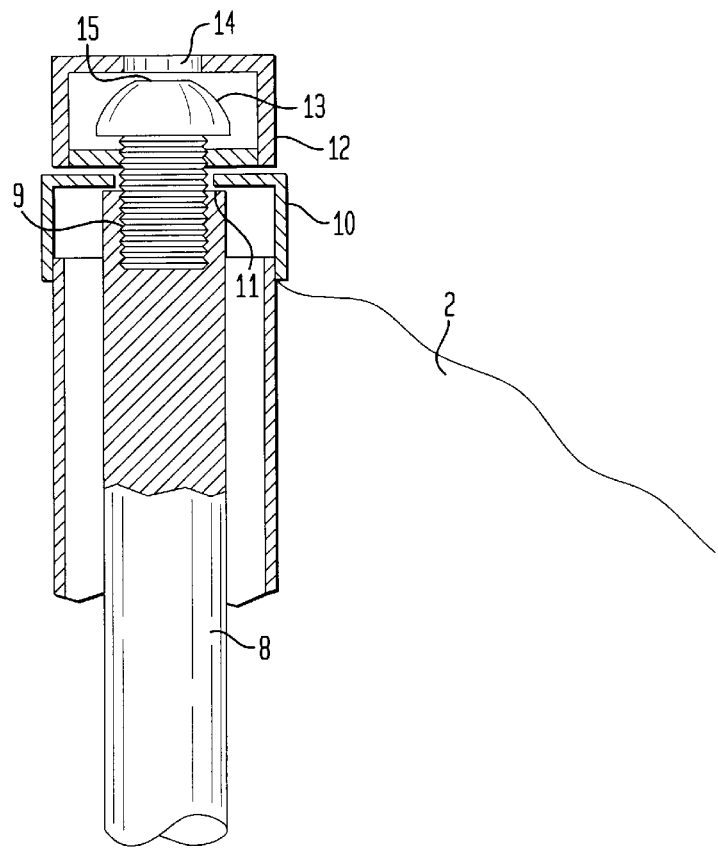
FIG. 2 is an elevational view, partly in section, of the top of a golf course pin and flag, showing a theft resistant locking cap of the invention.

In accordance with the invention illustrated in FIG. 2, the pin 8 terminates in a threaded hole 9 sized and threaded to receive the threaded shaft of the bolt 13. The bolt 13 is long enough bottom in the threaded hole 9 and still leave enough clearance for the end cap 10 and the protective shell 12 to be loosely captured between the shoulder 11 and the head of the bolt 13. The protective shell, being loosely captured, prevents any torque being applied to the bolt head by common tools like wrenches or pliers. The only access to the bolt 13 is through the access aperture 14. The aperture 14 is adjacent to a socket 15 in the head of bolt 13, the shape of which socket 15 is selected as not to fit commonly available tools.

Figure 3:
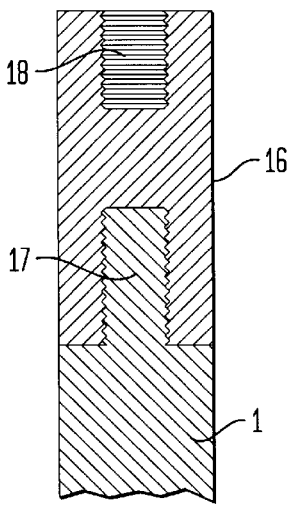
FIG. 3 is an elevational view in section of the top of a standard golf course pin and an adapter fitting to provide the pin with a terminal threaded hole.

A standard golf course pin terminates at its upper end in a threaded stud. FIG. 3 illustrates how such a standard pin can be adapted to receive a theft resistant locking cap of the invention. Here the pin 1 with its terminating threaded stud 17 is provided with an adapter fitting 16 of approximately the same diameter as the pin 1. The fitting 16 threads on to the stud 17 and has a threaded hole 18, sized and threaded to receive the threaded shaft of bolt 13.

Figure 4:
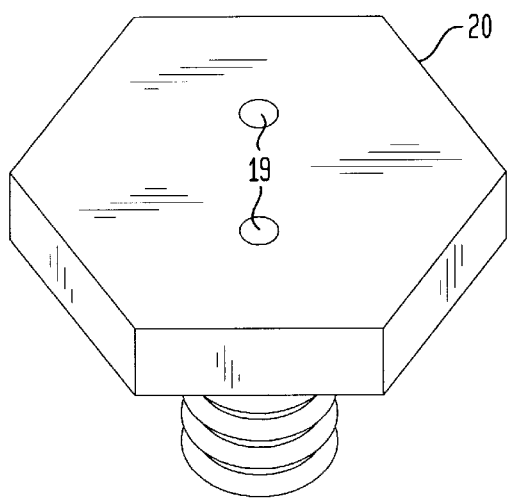
FIG. 4 is a perspective view of a bolt with an exemplary removal socket consisting of two demi-sockets.
Figure 5:
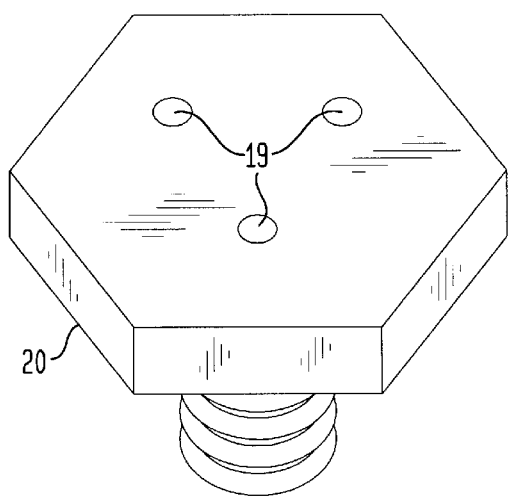
FIG. 5 is a perspective view of a bolt with an exemplary removal socket consisting of three demi-sockets.
Figure 6:
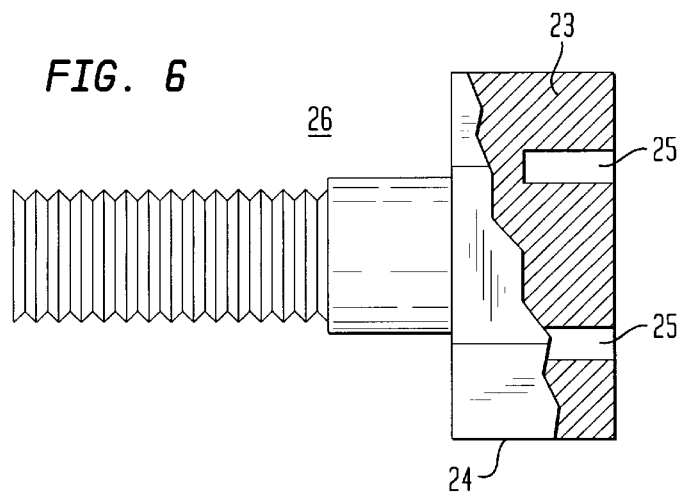
FIG. 6 is an elevational view in section of a bolt with a socket pattern of FIG. 4, showing an unthreaded shank portion.
Figure 7:
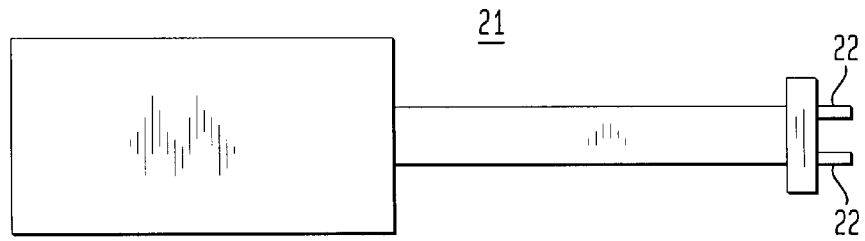
FIG. 7 is an elevational view of an exemplary tool adapted to fit the removal socket of FIG. 6.

FIGS. 4 and 5 show two exemplary socket patterns, possessing two and three demi-sockets 19 respectively. The demi-sockets are advantageously equidistant from the axis of the bolt 20. The tool 21 shown in FIG. 7 is equipped with two prongs 22 dimensioned to fit the demi-sockets of FIG.

4. The cut-away section 23 of bolt head 24 shows the demi-sockets 25 extending into the head 24 far enough for the tool 21 to exert a locking force on the bolt 26.

Figure 8:
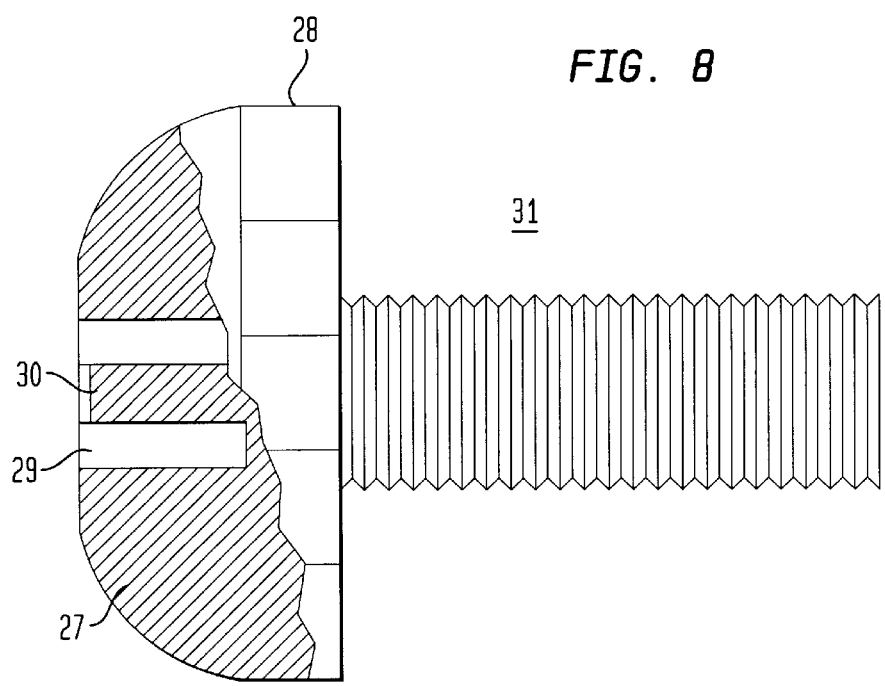
FIG. 8 is an elevational view in section of a bolt with a socket pattern having a hexagon well and a coaxial prong.
Figure 9:
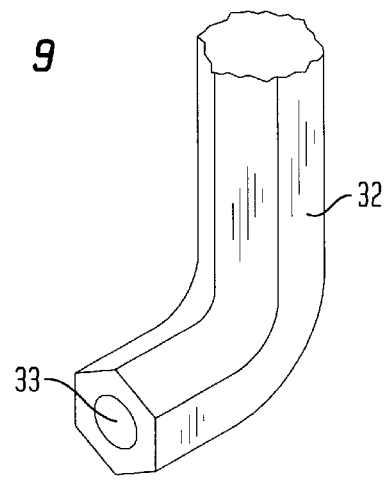
FIG. 9 is a perspective view of a tool adapted to fit the removal socket of FIG. 8.

In FIG. 8 the cut-away section 27 of the bolt head 28 shows a hexagonal socket 29 with an axial prong 30. The axial prong 30 prevents removal of the bolt 31 by a standard Allen wrench. The Allen-type wrench 32 illustrated in FIG. 9 is provided with a well 33 dimensioned to receive the prong 30 and permit the tool to engage the socket 29. The socket patterns illustrated in FIGS. 4, 5, and 8 are only exemplary of the many possible socket patterns that match tools (e. g., star tipped tools) not commonly in the posession of golfers or tourists.

I claim:

1. A theft resistant locking cap for securing a tube mounted flag to a golf flag pin comprising:
   a) a one piece shell with an access aperture, said shell consisting essentially of an upper annular member, a lower annular member, and a peripheral flange joining the upper annular member to the lower annular member, the upper annular member defining the access aperture extending therethrough of a first diameter and the lower annular member defining a securement aperture of a second diameter; and
   b) a bolt with a head and a threaded shank affixed thereto, the head having a greatest diameter larger than the first diameter and the second diameter, the head being loosely captured between the upper annular member and the lower annular member, the threaded shank extending loosely downward through the securement aperture, the upper surface of the head disposed adjacent to the access aperture, the bolt having an upwardly opening socket, the socket being shaped and dimensioned to resist turning of the bolt by common tools.

2. A device of claim 1 in which the socket defines a polygon with a coaxial prong projecting upward from the bottom of the socket so that turning the bolt requires an Allen-head type wrench having a coaxial well therein to accommodate the prong.

3. A device of claim 1 in which socket consists of at least two demi-sockets located equidistant from head's axis so that turning the bolt requires a tool with a set of downwardly projecting prongs dimensioned and spaced to correspond to the demi-sockets.

4. A pin mounted golf flag comprising:
   a) a flag pin terminating at its upper end in a threaded axial aperture of a first depth surrounded by a shoulder;
   b) a tube mounted flag comprising a tube terminating at its upper end in a tube cap defining an aperture larger than the pin's threaded aperture but smaller than the shoulder's diameter, the tube mounted flag being placed over the upper end of the flag pin, fitting loosely thereon with the tube cap resting on the shoulder; and
   c) a theft resistant locking cap for securing the tube mounted flag to the flag pin by loosely capturing the tube cap between the shoulder and the locking cap in which the theft resistant locking cap comprises:
   a) a one piece shell with an access aperture, said shell consisting essentially of an upper annular member a lower annular member and a peripheral flange joining the upper annular member to the lower annular member, the upper annular member defining the access aperture extending therethrough of a first diameter and the lower annular member defining a securement aperture of a second diameter and;
   b) a bolt with a head and a threaded shank affixed thereto, the head having a greatest diameter larger than the first diameter and the second diameter, being loosely captured between the upper annular member and the lower annular member, the threaded shank extending loosely downward through the securement aperture the upper surface of the head disposed adjacent to the access aperture, having an upwardly opening socket, the socket being shaped and dimensioned to resist the turning of the bolt by common tools.

5. A device of claim 4 in which the threaded shank is longer than the first depth and the difference between the length of the threaded shank and the first depth is greater than the sum of the thickness of the lower annular member and the thickness of the tube cap whereby, when the threaded shank is fully advanced into the threaded aperture, both the shell and the tube cap are loosely captured between the head and the shoulder permitting the tube mounted flag to rotate freely around the flag stick.

6. A device of claim 4 in which the threaded shank comprises an unthreaded portion at the end adjacent to the head, the length of which unthreaded portion is greater than the sum of the thickness of the lower annular member and the thickness of the tube cap, whereby, when the threaded shank is fully advanced into the threaded aperture, both the shell and the tube cap are loosely captured between the head and the shoulder permitting the tube mounted flag to rotate freely around the flag pin.

* * * * *

UNITED STATES PATENT AND TRADEMARK OFFICE
CERTIFICATE OF CORRECTION

PATENT NO. : 5,857,798
DATED : January 12, 1999
INVENTOR(S) : James L. Flynn

It is certified that error appears in the above-identified patent and that said Letters Patent is hereby corrected as shown below:

ON THE TITLE PAGE:
Please add item [73] Assignee: Eagle One Golf Products, Inc.
Elizabeth, New Jersey Attorney Agent or Firm - Allen N. Friedman;
McCarter & English, LLP Signed and Sealed this Thirty-first Day of October, 2000

Attest:

Q. TODD DICKINSON

*Attesting Officer*     *Director of Patents and Trademarks*